Patented Sept. 18, 1951

2,568,424

UNITED STATES PATENT OFFICE 2,568,424

COATING COMPOSITION FOR PROTECTING METAL SURFACES FROM CORROSION

Charles T. Watson, Bessemer, Ala., assignor to Tennessee Coal, Iron and Railroad Company, a corporation of Alabama No Drawing. Application April 20, 1949,
Serial No. 88,686

1 Claim. (Cl. 106—14)

This invention relates to an improved coating composition in the nature of a paint adapted to be applied to metal surfaces for protecting them from atmospheric corrosion. My improved composition is particularly effective for zinc and iron surfaces having a phosphate film formed thereon to inhibit corrosion and affords a continuous impermeable and adherent coating when applied thereover.

This is a continuation-in-part of my application Serial No. 688,714, filed August 6, 1946, now abandoned, for "Production of Corrosion Resisting Metal Surfaces and Composition Thereof."

Atmospheric corrosion of metal and particularly metal structural members exposed to the weather, is a perennial problem and numerous efforts have been made to provide a universally applicable protective coating therefor. So far as I am aware, however, no wholly satisfactory protective coating has become available. In order to supply this need, I have invented a novel paint having superior qualities of durability, adherence and protection against chemical action of any kind on the underlying metal.

The improved paint composition of my invention comprises a water-insoluble film-forming liquid vehicle carrying in suspension a large proportion, i. e., from one-third to one-half, of solids including phosphoric acid or metal salts thereof and preferably inert material in the nature of a pigment, filler or extender. For best results, the paint should be baked after application. The vehicle may be any of those commonly employed in the manufacture of paint, enamel or lacquer, specifically linseed oil, either alone or thinned with turpentine, or synthetic resin such as a phenol-formaldehyde condensation product, in linseed oil or other organic compound, e. g., amyl acetate. The suspended solids may include the phosphate of iron, manganese or zinc or a mixture of these phosphates. More specifically, the metal phosphate may be the secondary or tertiary phosphate of iron, manganese or zinc, as well as the primary phosphate, or a mixture of the several phosphates of one metal or more than one. I may also use phosphoric acid in addition to metal salts thereof. The pigment may be ground slate, lampblack or other such material or a mixture thereof. The filler may be a metal oxide such as zinc or titanium oxide, or a mixture of two or more such oxides.

The proportion of solid material to vehicle may vary over a considerable range, i. e., between a ratio of one to one and a ratio of one part solid material to two parts vehicle by weight. If the solids content be reduced below ⅓ by weight, the durability of the coating is impaired whereas if the solids exceed ½, the consistency is such as to interfere with easy brushing or spraying. The paint is applied to the surface to be protected in any convenient manner, i. e., as by spraying, brushing or dipping and the resulting coating is preferably baked for about 10 minutes at a temperature between 350° and 400° F.

In accordance with my invention, very good protecting qualities are obtained when mixtures of secondary and tertiary phosphates of iron, manganese, and zinc are used. Under equilibrium conditions secondary phosphates tend to decompose into mixtures of phosphoric acid, primary phosphates, secondary phosphates and tertiary phosphates which, in the presence of heat, react with phosphate-coated surfaces and facilitate coatings of high adhesion and low porosity. Primary phosphates react in a similar manner after decomposing into mixtures of phosphoric acid, primary phosphates, secondary phosphates and tertiary phosphates. Good protective qualities are obtained, however, when only tertiary phosphates are employed in paints applied over certain phosphate coatings.

The solid material suspended in the vehicle may consist of from 15 to 40% phosphate and from 15 to 40% zinc oxide both by weight, the balance being made up of pigment or other filler. Preferably the phosphate and oxide should each comprise at least 25% by weight of the total solids. With less than 15% of these compounds the desired protection is not assured. The use of more than 40% does not materially increase the protection afforded.

The invention may be more fully understood from a consideration of the following illustrative examples, all of which are designed primarily for use on zinc which previously has been given a phosphate treatment. The percentages in each example are by weight, as are the indicated number of parts.

EXAMPLE I

*Three parts pigment*

| | Per cent |
|---|---|
| Tertiary zinc phosphate | 40 |
| Zinc oxide | 40 |
| Titanium oxide | 20 |
| Total | 100 |

*Four parts vehicle*

| | Per cent |
|---|---|
| Linseed oil | 70 |
| Turpentine | 30 |
| Total | 100 |

EXAMPLE II

One part pigment

| | Per cent |
|---|---|
| Tertiary zinc phosphate | 40 |
| Zinc oxide | 40 |
| Titanium oxide | 20 |
| Total | 100 |

Two parts vehicle

| | Per cent |
|---|---|
| "Bakelite" | 85 |
| Amyl acetate | 15 |
| Total | 100 |

EXAMPLE III

Four parts pigment

| | Per cent |
|---|---|
| Tertiary zinc phosphate | 25 |
| Zinc oxide | 25 |
| Slate | 30 |
| Lampblack | 15 |
| Titanium oxide | 5 |
| Total | 100 |

Five parts vehicle

| | Per cent |
|---|---|
| Linseed oil | 100 |
| Total | 100 |

EXAMPLE IV

Four parts pigment

| | Per cent |
|---|---|
| Tertiary zinc phosphate | 25 |
| Zinc oxide | 25 |
| Slate | 30 |
| Lampblack | 15 |
| Titanium oxide | 5 |
| Total | 100 |

Five parts vehicle

| | Per cent |
|---|---|
| "Bakelite" | 90 |
| Amyl acetate | 10 |
| Total | 100 |

EXAMPLE V

Four parts pigment

| | Per cent |
|---|---|
| Tertiary zinc phosphate | 25 |
| Zinc oxide | 25 |
| Ferric oxide | 50 |
| Total | 100 |

Five parts vehicle

| | Per cent |
|---|---|
| Linseed oil | 95 |
| Turpentine | 5 |
| Total | 100 |

EXAMPLE VI

Three parts pigment

| | Per cent |
|---|---|
| Tertiary zinc phosphate | 25 |
| Zinc oxide | 25 |
| Ferric oxide | 50 |
| Total | 100 |

Five parts vehicle

| | Per cent |
|---|---|
| "Bakelite" | 60 |
| Amyl acetate | 40 |
| Total | 100 |

EXAMPLE VII

One part pigment

| | Per cent |
|---|---|
| Phosphate compound containing: | |
| $PO_4$ | 45 |
| Zn | 15 |
| Mn | 10 |
| Fe | 12 |
| Other | 18 |
| Total phosphates | 30 |
| Zinc oxide | 25 |
| Slate | 25 |
| Lampblack | 15 |
| Titanium oxide | 5 |
| Total | 100 |

One part vehicle

| | Per cent |
|---|---|
| Linseed oil | 45 |
| "Bakelite" | 55 |
| Total | 100 |

EXAMPLE VIII

One part pigment

| | Per cent |
|---|---|
| Phosphate compound containing: | |
| $PO_4$ | 45 |
| Zn | 15 |
| Mn | 10 |
| Fe | 12 |
| Other | 18 |
| Total phosphates | 30 |
| Zinc oxide | 25 |
| Slate | 25 |
| Lampblack | 15 |
| Titanium oxide | 5 |
| Total | 100 |

One part vehicle

| | Per cent |
|---|---|
| Linseed oil | 45 |
| "Bakelite" | 50 |
| Phosphoric acid | 5 |
| Total | 100 |

EXAMPLE IX

Two parts pigment

| | Per cent |
|---|---|
| Tertiary zinc phosphate | 25 |
| Secondary zinc phosphate | 10 |
| Zinc oxide | 35 |
| Titanium oxide | 10 |
| Ferric oxide | 20 |
| Total | 100 |

Three parts vehicle

| | Per cent |
|---|---|
| "Bakelite" | 90 |
| Amyl acetate | 10 |
| Total | 100 |

In all cases, the coating is applied by brushing, dipping or spraying and is preferably baked at 350° or 400° F. for about ten minutes.

The specific method of producing the ground coating of phosphate over which my improved coating is applied forms no part of the invention. Any suitable method may be employed. Where the surface to be protected is a zinc surface such as a galvanized coating, for example, it may be treated by contacting it with a phosphoric acid solution containing phosphates of iron, manganese and zinc, as described and claimed in my co-pending application Serial No. 72,751, filed January 25, 1949, which issued on July 10, 1951 as Patent No. 2,559,812 for "Solution and Method for Coating Zinc Surfaces." Other methods of producing the initial phosphate coating may be employed, however, as will readily be understood by those skilled in the art.

The improved coatings produced in accordance with my invention are highly resistant to atmospheric and other types of corrosion, and possess qualities of good adherence and appearance.

I claim:

A protective paint for metal surfaces comprising from 1/3 to 1/2 solids by weight suspended in a water insoluble film-forming vehicle, said solids consisting of from 15 to 40% by weight of a phosphate of a metal from the group consisting of iron, manganese and zinc, and substantially the balance inert filler.

CHARLES T. WATSON.

REFERENCES CITED

The following references are of record in the file of this patent:

UNITED STATES PATENTS

| Number | Name | Date |
| --- | --- | --- |
| 2,081,160 | Tanner | May 25, 1937 |
| 2,148,862 | Kern | Feb. 28, 1939 |
| 2,184,324 | Straus | Dec. 26, 1939 |
| 2,227,928 | Drucker | Jan. 7, 1941 |
| 2,385,800 | Douty et al. | Oct. 2, 1945 |